United States Patent
Tokar et al.

(10) Patent No.: US 6,368,374 B1
(45) Date of Patent: Apr. 9, 2002

(54) FILTER ARRANGEMENT AND METHODS

(75) Inventors: Joseph Tokar, Apple Valley; Ryan E. McVay, St. Louis Park, both of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/593,257

(22) Filed: Jun. 13, 2000

(51) Int. Cl.[7] ............................................... B01D 27/06
(52) U.S. Cl. .................. 55/498; 55/357; 55/502; 55/510; 55/521; 210/443; 210/455; 210/456
(58) Field of Search .................. 55/456, 457, 458, 55/447, DIG. 17, 493, 498, 502, 510, 521, 357; 95/269; 210/443, 455, 456, 493.4, 497.1

(56) References Cited

U.S. PATENT DOCUMENTS

| | | |
|---|---|---|
| 2,502,545 A | 4/1950 | Wellborn |
| 2,599,604 A | 6/1952 | Bauer et al. |
| 3,076,554 A | 2/1963 | Bub |
| 4,065,341 A | 12/1977 | Cub |
| 4,312,645 A * | 1/1982 | Mavros et al. ................. 55/493 |
| 4,652,285 A | 3/1987 | Greene |
| 4,698,078 A * | 10/1987 | Mavros ......................... 55/493 |
| 4,769,096 A | 9/1988 | Vander Giessen et al. |
| 4,854,950 A * | 8/1989 | Kierkowski et al. .......... 96/400 |
| 5,137,696 A | 8/1992 | Hitachi et al. |
| 5,229,078 A | 7/1993 | Haerle |
| 5,266,195 A | 11/1993 | Hopkins |
| 5,346,675 A | 9/1994 | Usui et al. |
| 5,374,402 A | 12/1994 | Hitachi et al. |
| 5,750,026 A | 5/1998 | Gadkaree et al. |
| 5,772,883 A | 6/1998 | Rothman et al. |
| D396,098 S | 7/1998 | Gillingham et al. |
| 5,792,247 A | 8/1998 | Gillingham et al. |
| 5,820,646 A | 10/1998 | Gillingham et al. |
| 5,853,443 A * | 12/1998 | Rodgers et al. ........ 55/DIG. 17 |
| 5,895,574 A | 4/1999 | Friedmann et al. |

OTHER PUBLICATIONS

"GDX™Pulse Cleaning Filter System", Donaldson Gas Turbine Systems Brochure, 4 pgs. (1996).

* cited by examiner

Primary Examiner—David A. Simmons
Assistant Examiner—Minh-Chan T. Pham
(74) Attorney, Agent, or Firm—Merchant & Gould, P.C.

(57) ABSTRACT

A filter arrangement includes a filter assembly, a filter housing, a seal member, and a moisture separator. The filter assembly has opposite first and second ends, a first axial length between the first and second ends, and a plurality of flutes. Each of the flutes has a first end portion adjacent to the filter assembly first end, and a second end portion adjacent to the filter assembly second end. Selected flutes are open at the first end portion and closed at the second end portion and other selected flutes are closed at the first end portion and open at the second end portion. The filter housing circumscribes the filter assembly. The seal member at least partially circumscribes the filter assembly. The seal member seals a joint between the filter assembly and the filter housing. The seal member also helps to secure the filter assembly within the filter housing. The moisture separator is positioned upstream of the filter assembly and collects moisture from an incoming air stream prior to entrance of the air stream into the filter assembly.

17 Claims, 16 Drawing Sheets

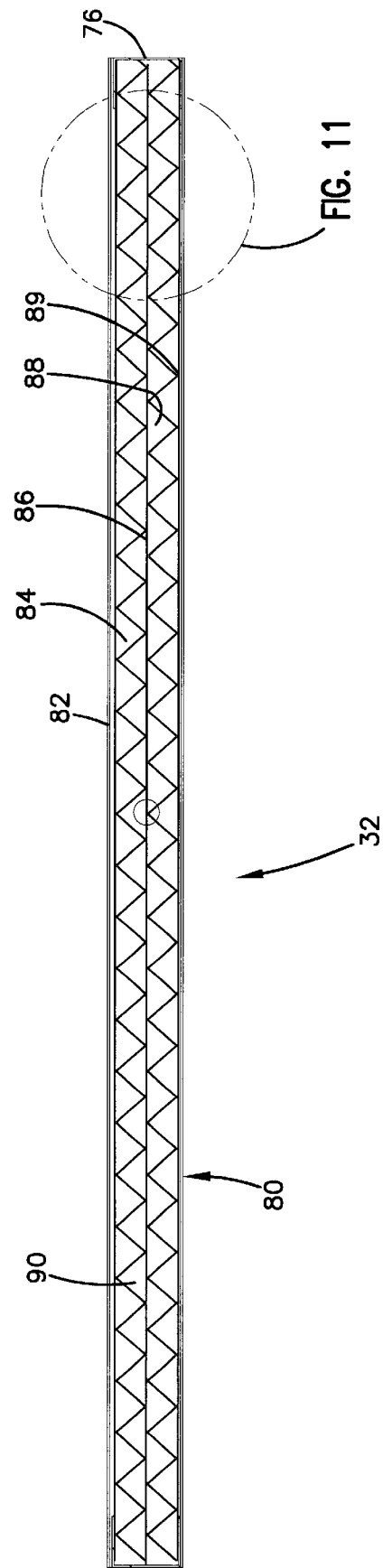

FIG. 15

FILTER ARRANGEMENT AND METHODS

TECHNICAL FIELD

This disclosure describes filter constructions for filtering fluids, such as gas or liquid. In particular, this disclosure describes a filter element, a housing, and methods particularly useful with gas turbine systems.

BACKGROUND

Gas turbine systems are useful in generating electricity. These types of systems are particularly convenient in that they can be constructed quickly; they are also desirable because they produce fewer harmful emissions than coal or oil based turbine systems. Gas turbines utilize air for combustion purposes. Due to the precision moving parts in these types of systems, the combustion air needs to be clean. To ensure clean air for combustion, air filters have been used to clean the air taken into the gas turbine system. In prior art systems, a series of panel filters have been used to clean intake air. As systems become more sophisticated, cleaner air is required. This causes an increase in cost.

Therefore, improvements in cleaning air intake into gas turbine systems is desirable.

SUMMARY OF THE DISCLOSURE

In one aspect, the disclosure describes a filter arrangement. The filter arrangement includes a filter assembly, a filter housing, a seal member, and a moisture separator. The filter assembly has opposite first and second ends, a first axial length between the first and second ends, and a plurality of flutes. Each of the flutes has a first end portion adjacent to the filter assembly first end, and a second end portion adjacent to the filter assembly second end. Selected flutes are open at the first end portion and closed at the second end portion and other selected flutes are closed at the first end portion and open at the second end portion.

The filter housing circumscribes the filter assembly. The seal member at least partially circumscribes the filter assembly. The seal member seals a joint between the filter assembly and the filter housing. The seal member also helps to secure the filter assembly within the filter housing. The moisture separator is positioned upstream of the filter assembly and collects moisture from an incoming air stream prior to entrance of the air stream into the filter assembly.

In a second aspect, the disclosure describes a filtration system. The filtration system includes a tube sheet having at least a single cavity, a filter housing that is removably and replaceably mounted in the cavity, a filter assembly secured within the filter housing, and a moisture separator. The filter assembly and moisture separator have structure analogous to that described above.

In a third aspect, the disclosure describes a method of servicing an air filtration system for a gas turbine system. The method includes opening an access door to the gas turbine system; removing a filter assembly having a pull mechanism from a filter housing; the filter housing being mounted through a cavity in a tube sheet; replacing the filter assembly with a second filter assembly by pressing the second filter assembly within the filter housing until it is secured within the filter housing; and closing the access door to the gas turbine system.

BRIEF DESCRIPTION OF THE DRAWINGS

FIG. 10 is a schematic, cross-sectional view, taken along line 10—10, of the moisture separator depicted in FIG. 9;

FIG. 15 is a schematic, perspective view of one embodiment of a portion of filter media usable in the filter assembly depicted in FIGS. 12–14;

DETAILED DESCRIPTION

A. System Description

Figure 1:
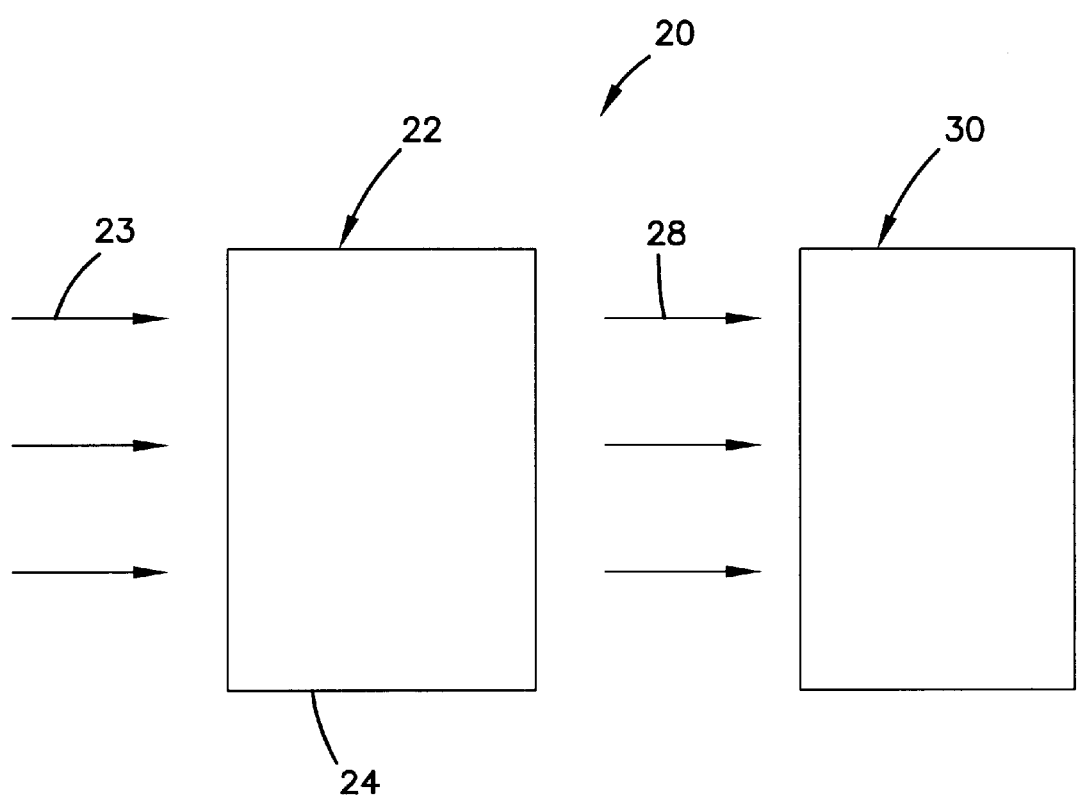
FIG. 1 is a schematic view of one embodiment of an air intake system for a gas turbine system having air filter arrangements constructed according to principles disclosed herein.

The air cleaner arrangements and constructions disclosed herein are usable in a variety of systems. FIG. 1 depicts one example system, in this case, a gas turbine system schematically represented at 20. In one particular embodiment, the air cleaner arrangements and constructions disclosed herein are usable in micro turbines. In general, micro turbines are smaller versions of gas turbines typically used as stand-by generators. In some instances, such micro turbines are approximately 24 inches by 18 inches and have electrical power output typically between 30 kilowatts and 100 kilowatts. These systems typically have air flow between 1000 cfm and 10,000 cfm.

In FIG. 1, airflow is shown drawn into an air intake system 22 at arrows 23. The air intake system 22 includes a filter arrangement 24. As the air is drawn through the filter arrangement 24, the air is cleaned in the air filter arrangement 24, and then flows downstream at arrows 28 into a gas turbine generator 30, where it is used in the generation of electrical power.

Figure 2:
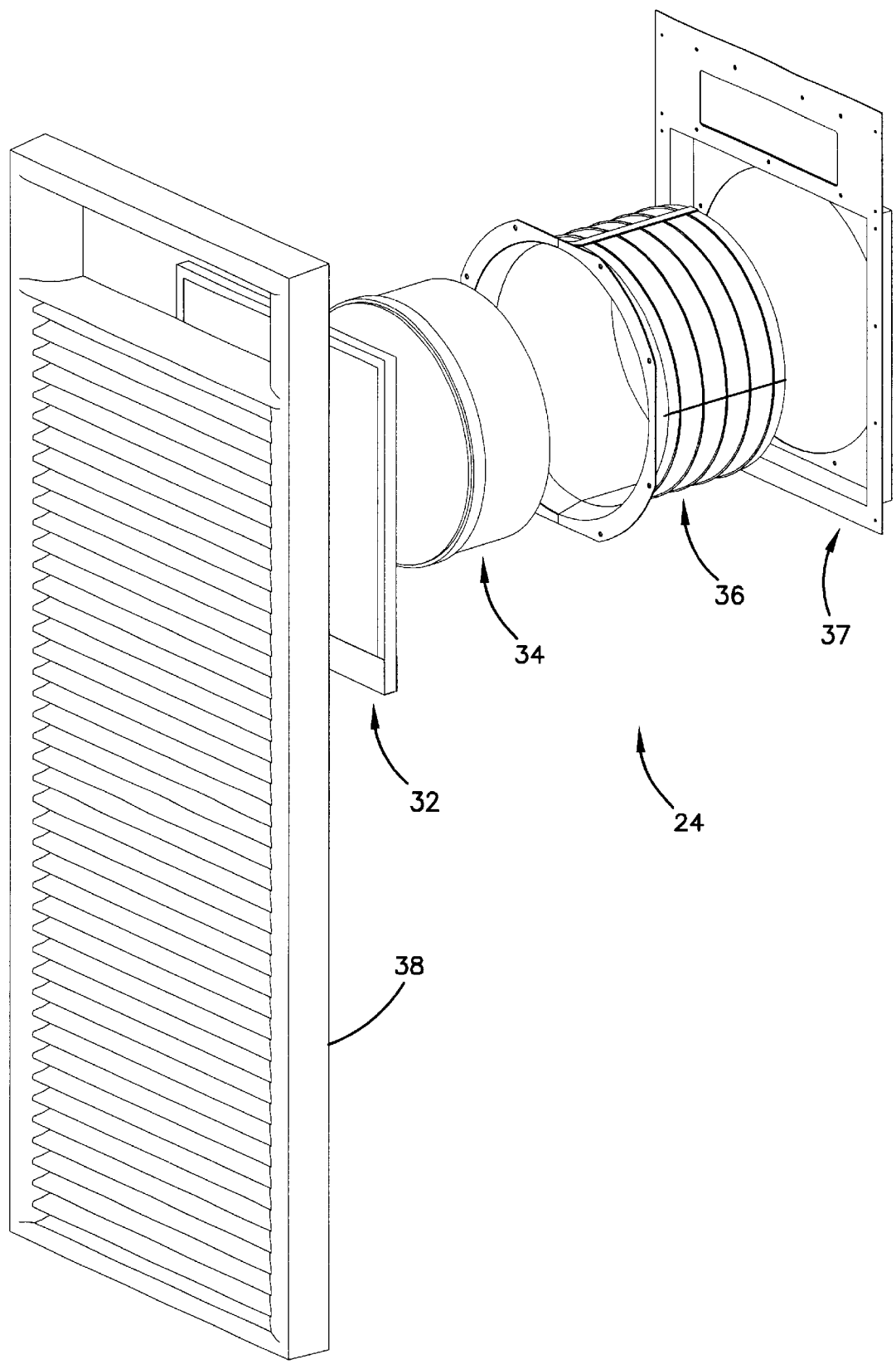
FIG. 2 is a schematic, exploded, perspective view of one embodiment of a filter arrangement for use in the system of FIG. 1.
Figure 3:
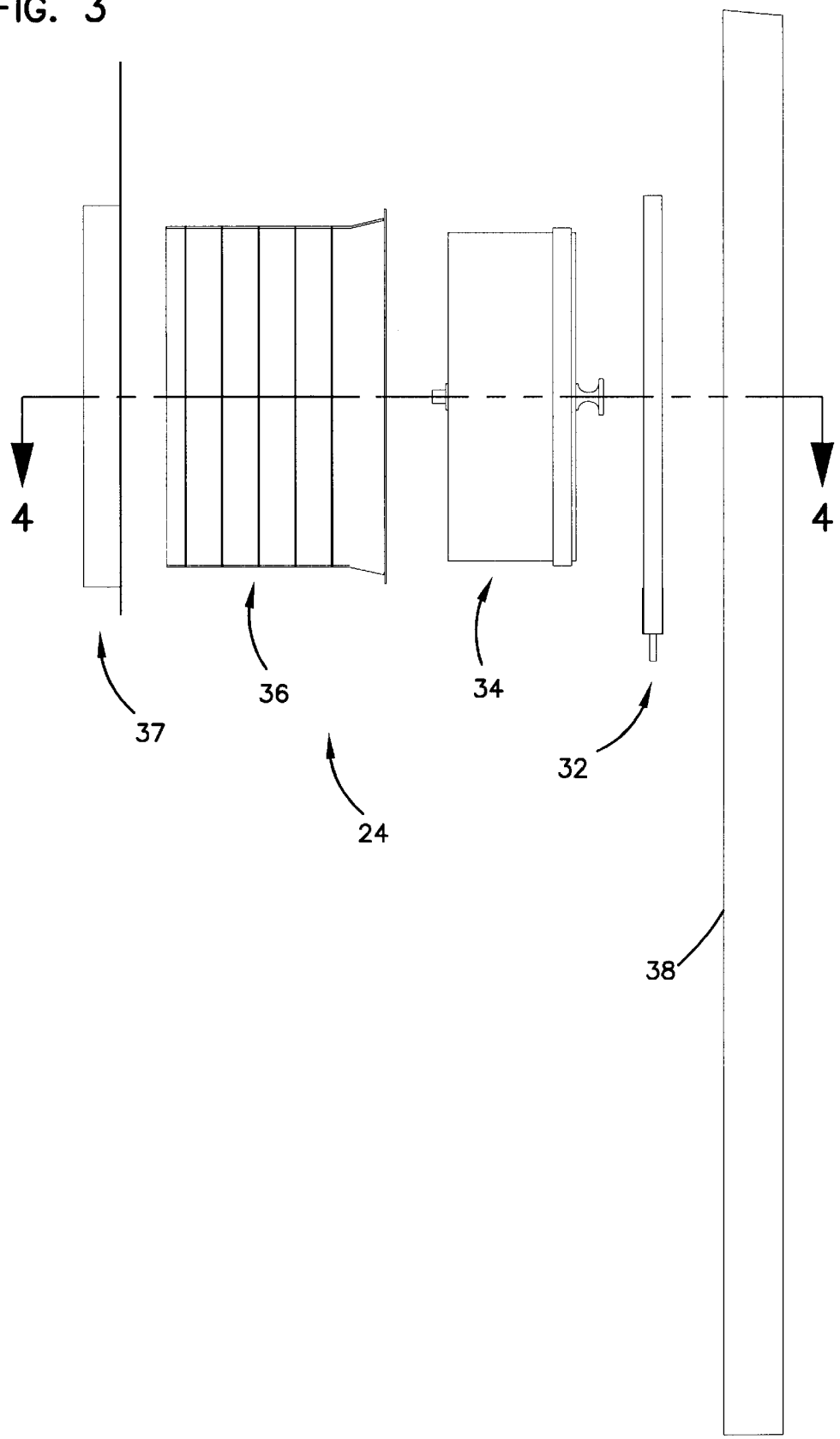
FIG. 3 is a schematic, exploded, side elevational view of the filter arrangement depicted in FIG. 2.
Figure 4:
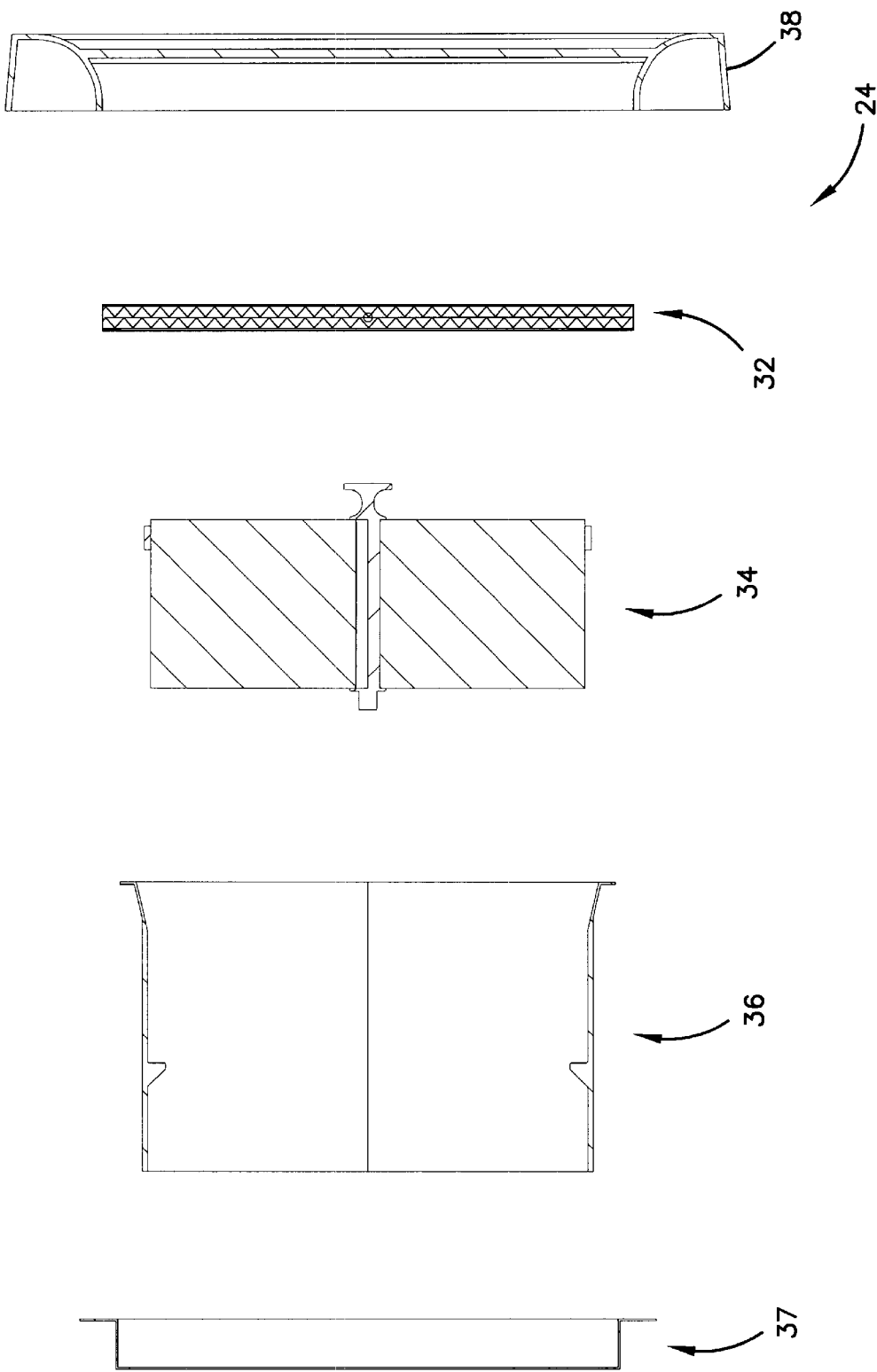
FIG. 4 is a schematic, cross-sectional view, taken along line 4—4 of FIG. 3, of the filter arrangement depicted in FIGS. 2 and 3.
Figure 5:
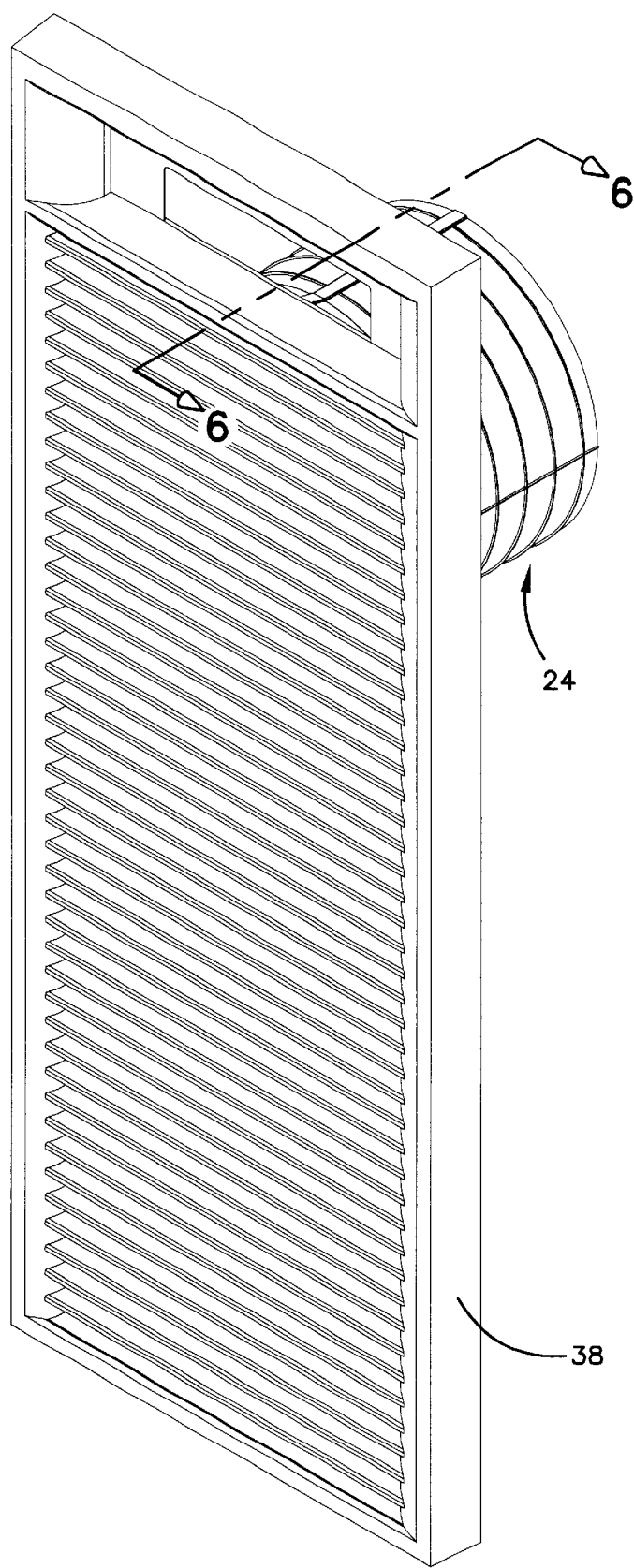
FIG. 5 is a schematic, assembled, perspective view of the filter arrangement depicted in FIG. 2.
Figure 6:
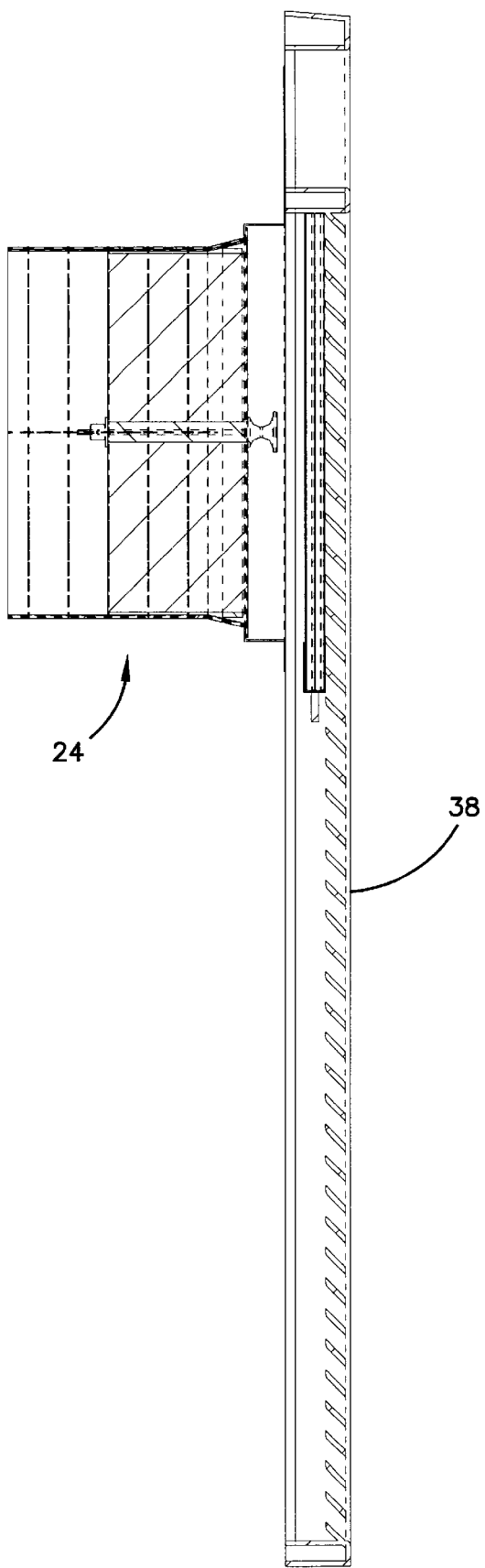
FIG. 6 is a schematic, cross-sectional view, taken along line 6—6 of FIG. 5, of the filter arrangement depicted in FIG. 5.

One example of an air filter arrangement 24 usable in the system 20 is shown in FIGS. 2–19. FIGS. 2–4 illustrate the filter arrangement 24 in an exploded, unassembled form, while FIGS. 5–6 illustrate the filter arrangement 24 assembled for use. In general, the air filter arrangement 24 includes a moisture separator 32, a filter assembly 34, and a filter housing 36. The filter housing 36 is typically secured within a tube sheet 37 when assembled for use. Preferably, the filter housing 36 is secured within the tube sheet 37 by welding the housing 36 to the tube sheet 37 or by bolting the housing 36 to the tube sheet 37 as will be described in more detail below.

B. Access Door

Figure 7:
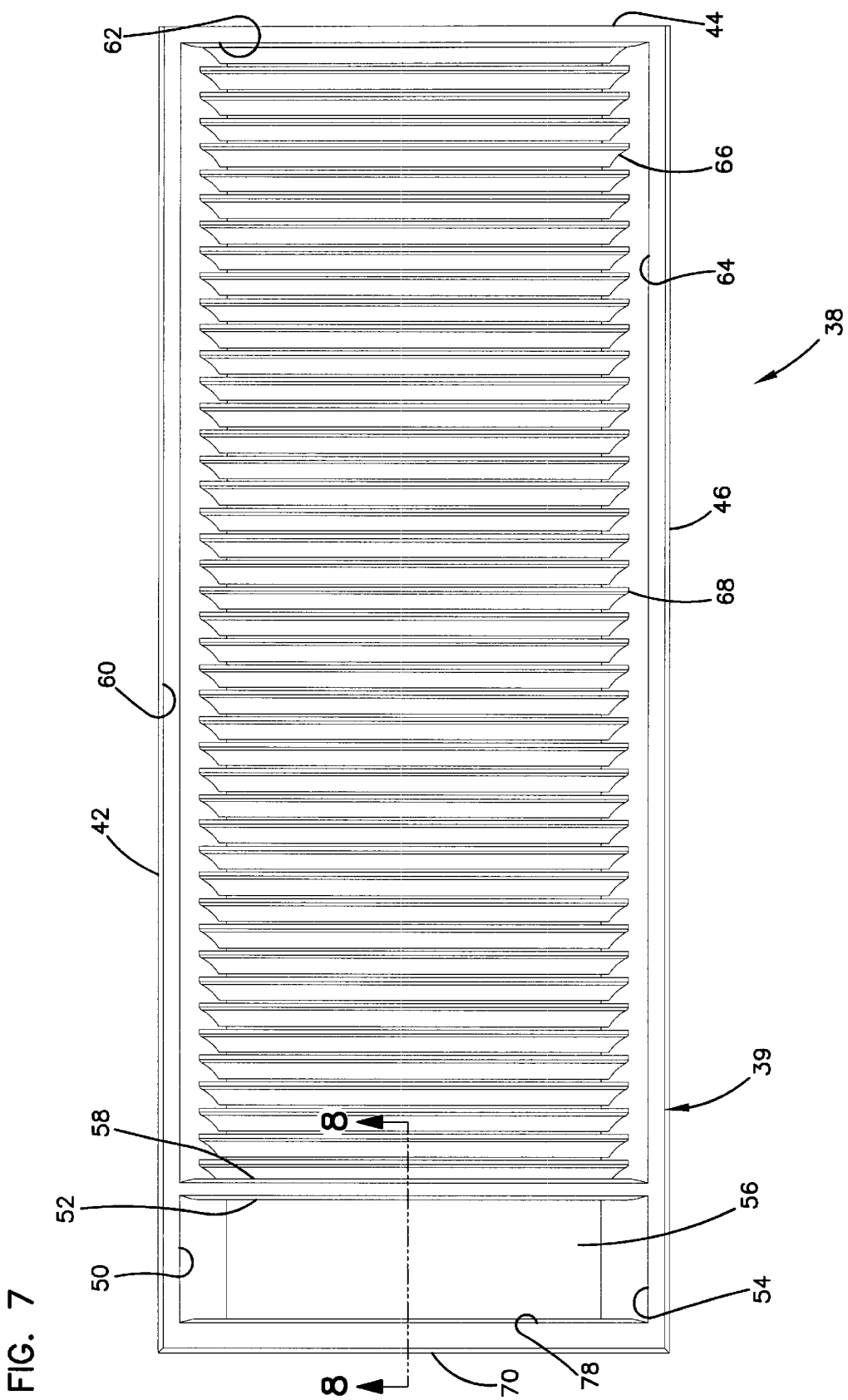
FIG. 7 is a schematic, plan view of an access door of the filter arrangement depicted in FIGS. 2–4.

An access door 38 provides access to the filter arrangement 24 when assembled and allows air to be drawn into the system 20. Attention is directed to FIG. 7. FIG. 7 is a schematic, enlarged view of the access door 38 of the filter arrangement 24, FIG. 2. In general, the access door 38 is designed and constructed to fit the particular housing of the system, such as the system 20, of FIG. 1, it is to be installed in and to provide access to the filter arrangement 24, FIG. 2, when assembled. The access door 38 is also designed and constructed to allow air to enter the system 20, FIG. 1.

The access door 38 includes a frame construction 39 that allows air to enter the system and provides access to a control panel. Preferably, the frame construction 39 includes first, second, third, and fourth outer walls 40, 42, 44, 46. In addition, the access door 38 includes a first cavity 56 to provide access to a control panel of the system 20, FIG. 1, when assembled for use. In the particular arrangement depicted, the first cavity 56 is defined by a non-circular, in particular a rectangular cavity 56, but could be other configurations. In FIG. 7, the first cavity 56 is defined by first, second, third, and fourth inner walls 48, 50, 52, 54.

The access door also includes a second cavity 66. The second cavity 66 is an inlet for air to be drawn into the filter arrangement 24 of FIG. 2 when assembled for use. In the particular embodiment depicted, the second cavity 66 is defined by a non-circular, in particular, a rectangular cavity 66, but could be other configurations. In FIG. 7, the second cavity 66 is defined by fifth, sixth, seventh, and eighth inner walls 58, 60, 62, 64.

The access door 38 preferably includes an air flow resistance arrangement 67. In general, the air flow resistance arrangement 67 directs air flow into the filter arrangement 24 in a particular direction to reduce resistance through the system 20. The air flow resistance arrangement 67 also aids in noise attenuation. In the embodiment depicted in FIG. 7, the air flow resistance arrangement is depicted as a plurality of louvers 68. Typically, the louvers 68 extend between the sixth and eighth inner walls 60, 64 and are secured therebetween. The louvers 68 are designed and constructed to direct air flow into the filter arrangement 24 and reduce resistance to air flow. The louvers 68 also aid in protecting the system 20 from entry of large objects and moisture through the second cavity 66 and into the system 20, FIG. 1. The louvers 68 further aid in noise attenuation.

Figure 8:
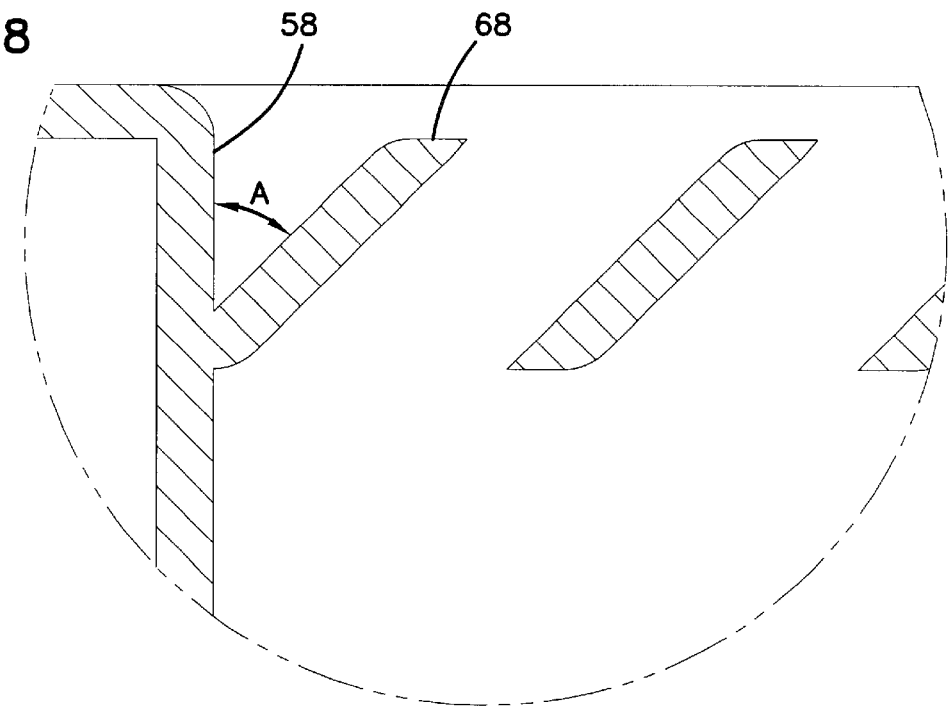
FIG. 8 is a schematic, cross-sectional view, taken along line 8—8, of a portion of the access door of FIG. 7.

Attention is directed to FIG. 8. FIG. 8 is a enlarged section view taken along line 8—8 of FIG. 7. Preferably, the louvers 68 are angled relative to the fifth inner wall 58 at an angle A. The particular angle chosen for angle A determines the air flow resistance through the system 20 and is dependant on the desired air flow characteristics for the intended application. Typically the angle A is at least 10 degrees, preferably between 20 and 60 degrees, and most preferably 45 degrees.

C. Moisture Separator

Moisture in the incoming air stream can damage the integrity of the filter assembly 34, FIG. 2, and damage, i.e. contribute to rusting, the internal mechanisms of the system 20. Referring back to FIG. 2, preferably, the filter arrangement includes a moisture separator 32. In general, the moisture separator 32 separates and collects moisture from the incoming air stream 23, FIG. 1, prior to reaching the filter assembly 34.

Figure 11:
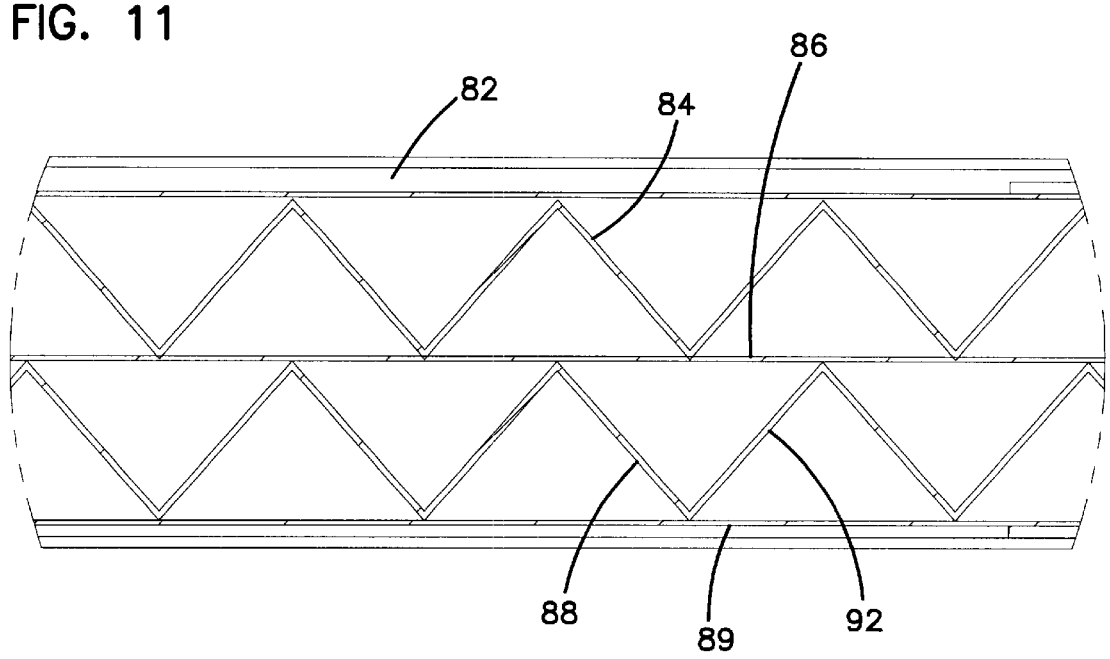
FIG. 11 is a schematic, enlarged view of a portion of the moisture separator of FIG. 10.
Figure 9:
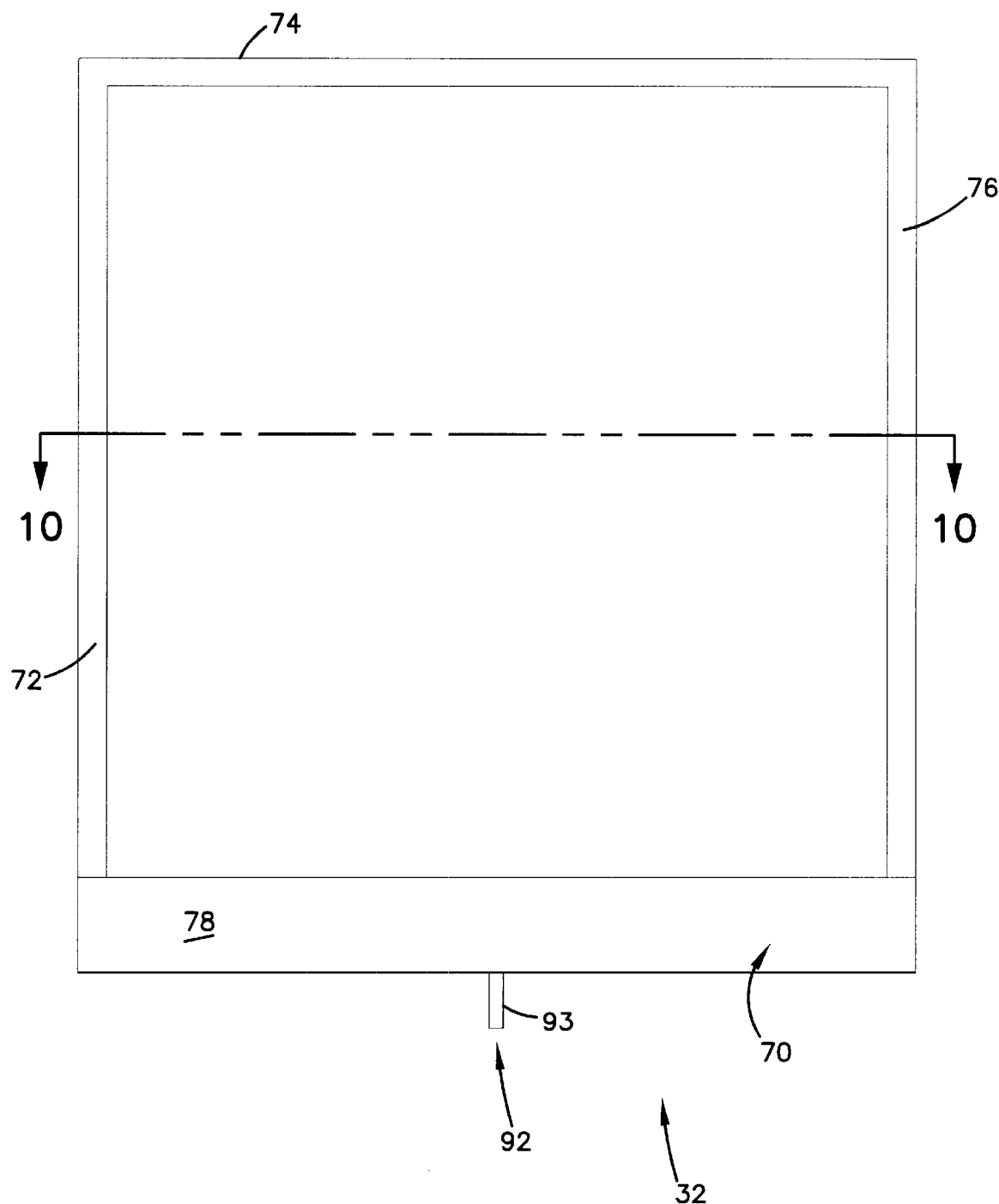
FIG. 9 is a schematic, plan view of a moisture separator of the filter arrangement depicted in FIGS. 2–4.

Attention is directed to FIG. 9. FIG. 9 is a schematic, enlarged view of the moisture separator 32 of the filter arrangement 24, FIG. 2. Preferably, the moisture separator 32 includes a frame construction 70. Preferably, the frame construction 70 includes first, second, third, and fourth frame members 72, 74, 76, 78. Attention is directed to FIGS. 10 and 11. FIG. 10 is a cross-sectional view of the moisture separator 32 taken along lines 10—10 of FIG. 9. In general, the frame members 72–78 have a U-shaped cross-section. In FIG. 10, the first and third frame members 72, 76 are illustrated in cross-section. Typically, the fourth frame member 78 is oriented such that the fourth frame member 78 comprises the bottom or lower frame member 78.

FIG. 11 is an enlarged view of a portion of FIG. 10. The moisture separator 32 also includes a moisture collection system 80 contained with the frame construction 70. Preferably, the moisture collection system 80 includes a plurality of moisture layers arranged to capture moisture that enters the system 20, FIG. 1, before reaching the filter assembly 34. In the moisture separator 32 shown in FIG. 11, the moisture separator 32 includes at least two layers, and preferably first, second, third, fourth, and fifth moisture layers 82, 84, 86, 88, 89. In general, the frame members 72–78 have a U-shaped cross-section as illustrated. Preferably, the moisture layers 82–89 are held within the frame construction 70, within the U-shaped cross-section as illustrated.

Preferably, the first, third, and fifth moisture layers 82, 86, 89 are flat screens. Typically, the first, third, and fifth moisture layers 82, 86, 89 comprise a wire mesh woven into a 14×14 screen having 14 openings per inch. Typically, the wire mesh has a diameter of at least 0.01 inches and preferably about 0.015 inches. Preferably, the second and fourth moisture layers 84, 88 are pleated screens having a plurality of pleats 90 orientated vertically. Typically, the second and fourth moisture layers 84, 88 also comprise a wire mesh woven into an 8×8 screen having 8 openings per inch. Preferably, the moisture layers 82–89 of the moisture separator 32 comprise a material suitable to remove moisture from the incoming air stream. Of course, any suitable material can be used.

Referring back to FIG. 9, moisture collects on the moisture layers 82–89. As such, preferably, the moisture separator 32 includes a drain construction 92. The drain construction 92 is arranged and configured to drain moisture from the system 20, FIG. 1, after collection by the moisture separator 32. After a period of collection, moisture will collect into droplets and will run down the pleat pockets to the bottom of the fourth frame member 78 by gravity. Preferably, the fourth frame member 78 includes a drain tube 93, FIG. 9. The drain tube 93 allows for drainage of the collected water from the bottom of the fourth frame member 78 and out of the system 20.

D. Filter Assembly

Figure 12:
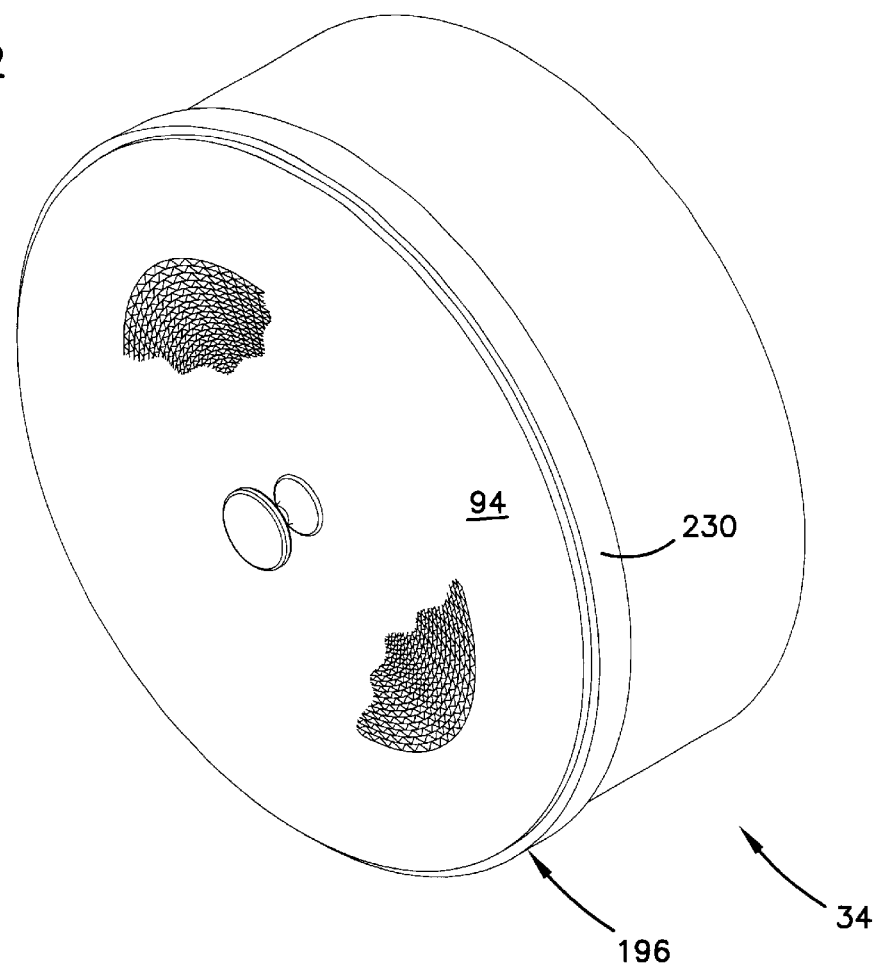
FIG. 12 is a schematic, perspective view of a filter assembly of the filter arrangement depicted in FIGS. 2–4.
Figure 13:
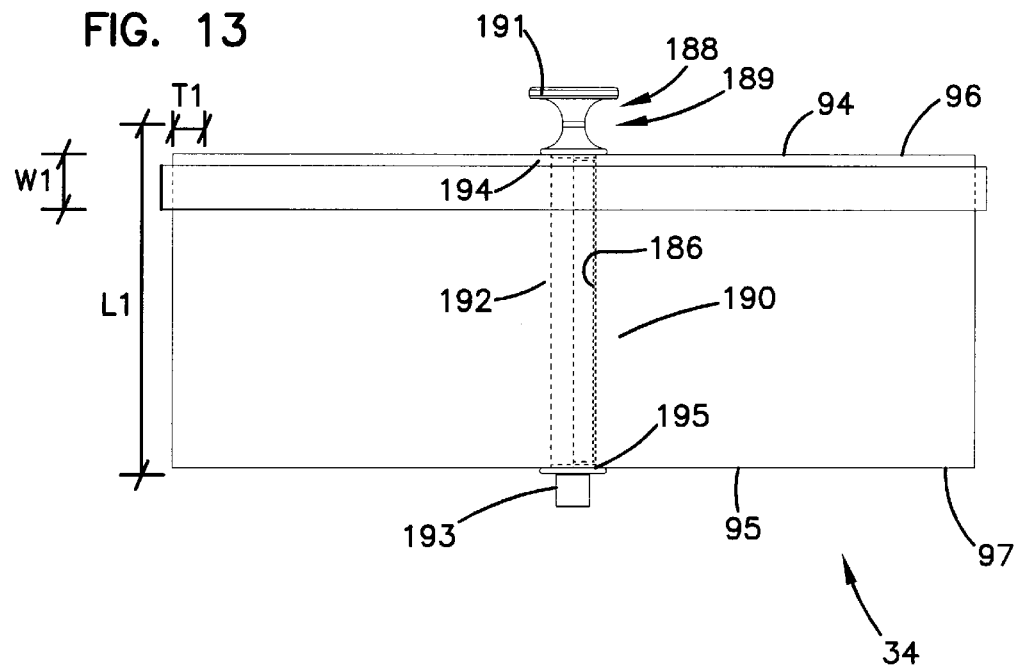
FIG. 13 is a schematic, side-elevational view of the filter assembly depicted in FIG. 12.
Figure 14:
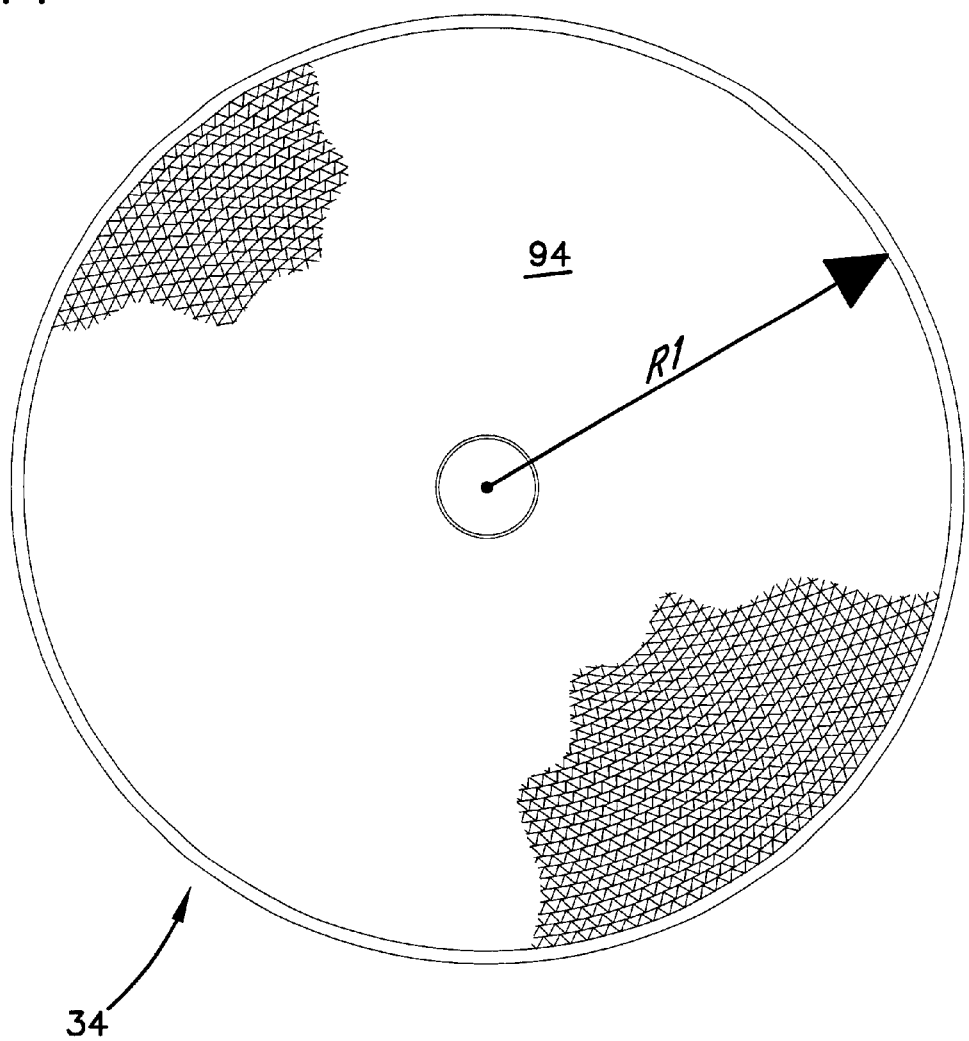
FIG. 14 is a schematic, plan view of the filter assembly depicted in FIGS. 12–13.

Attention is directed to FIGS. 12–14. In general, the filter assembly 34 removes contaminants from the incoming air stream 23, FIG. 1, prior to entry into the internal mechanisms of the system 20, FIG. 1. Contaminants can damage components of the system 20, of FIG. 1.

Preferably, the filter assembly 34 is configured to permit straight through flow. By the term "straight through flow," it is meant that the fluid flows directly through the filter assembly 34, entering at an inlet face 94 and exiting at an oppositely disposed outlet face 95, wherein the direction of fluid flow entering the inlet face 94 is in the same direction of fluid flow exiting the outlet face 95. In FIGS. 12 and 14, it should be understood that the inlet face 95 is shown schematically. That is, only a portion of the face 95 is shown with flutes. It should be understood that, in typical systems, the entire face 95 will be fluted.

The filter assembly 34 has a first end 96 and an opposite, second end 97. In the arrangement depicted in FIGS. 12–14, the first end 96 will correspond to the upstream end inlet face 94, while the second end 97 will correspond to a downstream end outlet face 95. The straight through flow allows gas to flow into the first end 96 and exit the second end 97, such that the direction of the air flow into the first end 96 is the same direction of air flow that is exiting the second end 97. Straight through flow patterns can reduce the amount of turbulence in the gas flow.

Preferably, the filter assembly 34 is designed and constructed to provide the rated air flow capacity required by the system 20 of FIG. 1. The size of the filter assembly 34 is a factor in the determination of the air flow capacity of the filter assembly 34. Therefore, the size of the filter assembly 34 is dictated by the particular application for the filter assembly 34. Other factors contribute to the air flow capacity of the filter assembly 34 as well, for example, the material type and the filter media design.

Figure 15:
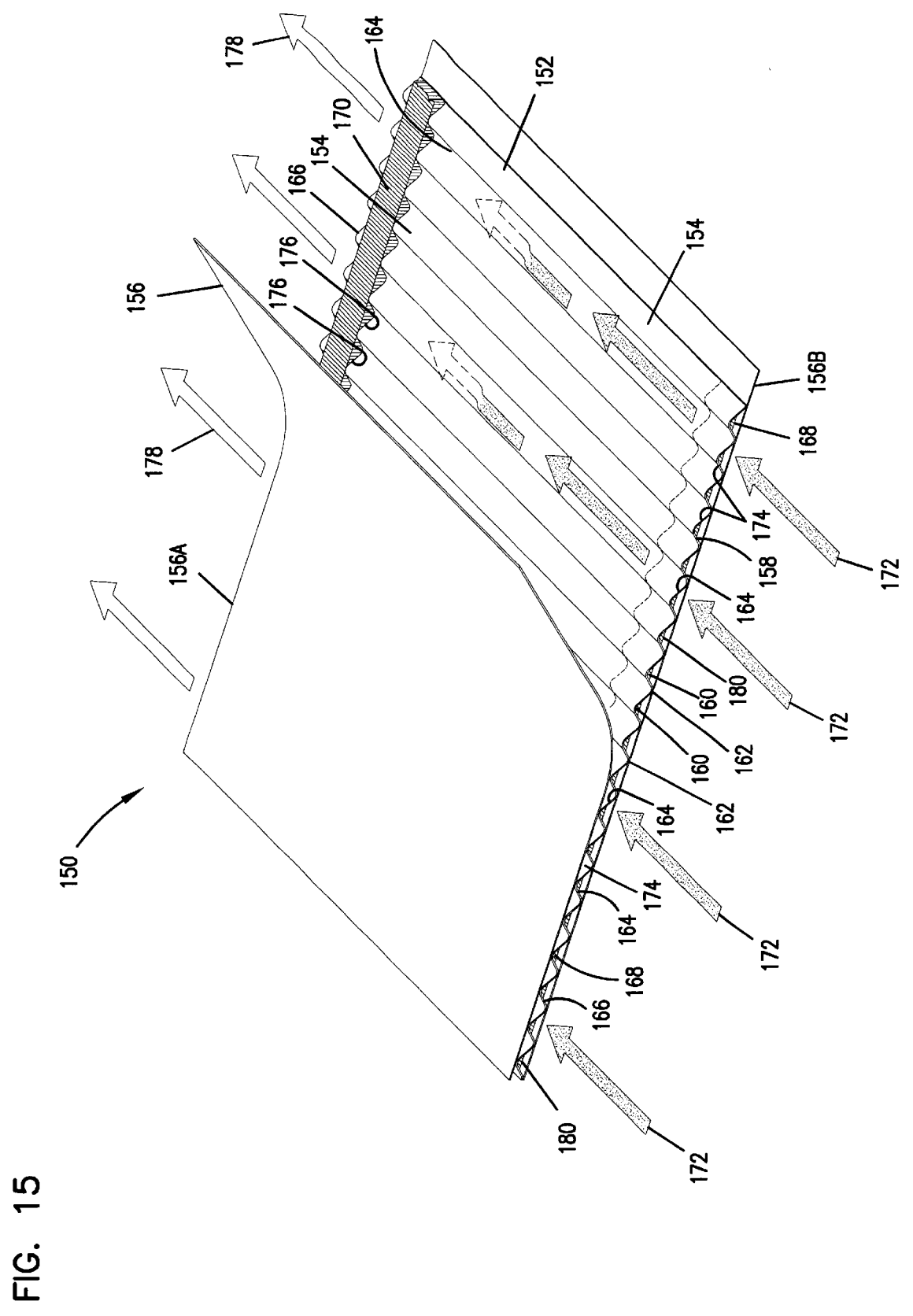

Attention is directed to FIG. 15. FIG. 15 is a schematic, perspective view demonstrating the principles of operation of certain preferred media usable in the filter assembly 34. In FIG. 15, filter media in the form of a fluted construction is generally designated at 150. Preferably, the fluted construction 150 includes: a layer 152 of corrugations having a plurality of flutes 154 and a face sheet 156. The FIG. 15 embodiment shows two sections of the face sheet at 156A (depicted on top of the corrugated layer 152) and at 156B (depicted below the corrugated layer 152). Typically, the preferred fluted construction 150 will include the corrugated layer 152 secured to the bottom face sheet 156B. When using this fluted construction 150 in a rolled construction, it typically will be wound around itself, such that the bottom face sheet 156B will cover the top of the corrugated layer 152. The face sheet 156 covering the top of the corrugated layer 152 is depicted as 156A. It should be understood that the face sheet 156A and 156B are the same sheet 156.

When using this type of fluted construction 150, the flute chambers 158 preferably form alternating peaks 160 and troughs 162. The troughs 162 and peaks 160 divide the flutes into a two rows, one being positioned adjacent to (in FIG. 15 over or on top of) the other row. In the particular configuration shown in FIG. 15, the upper flutes form flute chambers 164 closed at the downstream end, while flute chambers 166 having their upstream ends closed form the lower row of flutes. The fluted chambers 166 are closed by a first end bead 168 that fills a portion of the upstream end of the flute between the fluting sheet 152 and the second facing sheet 156B. Similarly, a second end bead 170 closes the downstream end of alternating flutes 164.

When using media constructed in the form of fluted construction 150, during use, unfiltered fluid, such as air, enters the flute chambers 164 as indicated by the shaded arrows 172. The flute chambers 164 have their upstream ends 174 open. The unfiltered fluid flow is not permitted to pass through the downstream ends 176 of the flute chambers 164 because their downstream ends 176 are closed by the second end bead 170. Therefore, the fluid is forced to proceed through the fluting sheet 152 or face sheet 156. As the unfiltered fluid passes through the fluting sheet 152 or face sheet 156, the fluid is cleaned or filtered. The cleaned fluid is indicated by the unshaded arrow 178. The fluid then passes through the flute chambers 166, which have their upstream ends 180 closed to flow through the open downstream ends out the fluted construction 150. With the configuration shown, the unfiltered fluid can flow through the fluted sheet 152, the upper facing sheet 156A, or the lower facing sheet 156B and into a flute chamber 166.

The fluted construction 150 is typically wound into a rolled or coiled form, such as shown in FIG. 12. A variety of ways can be used to coil or roll the fluted construction 150. The fluted construction 150 may be wrapped around a central core; alternatively, the fluted construction 150 may be coreless. In the embodiment illustrated in FIGS. 12–14, the fluted construction 150, FIG. 15, is wrapped around a central core 186. Referring again to FIGS. 12–14, note the cross-sectional shape of the filter element 130 is generally circular. The cross-section also could be non-circular, in other embodiments, such as obround or "racetrack shaped." By "obround" or "racetrack shaped," it is meant that a filter element would define a curved (in some embodiments, semicircular) end and an opposite curved (in some embodiments, semicircular) end. The curved ends would be joined by a pair of straight segments.

The media 150 can be a polyester synthetic media, a media made from cellulose, or blends of these types of materials. One example of usable cellulose media is: a basis weight of about 45–55 lbs./3000 ft$^2$ (84.7 g/m$^2$), for example, 48–54 lbs./3000 ft$^2$; a thickness of about 0.005–0.015 in, for example about 0.010 in. (0.25 mm); frazier permeability of about 20–25 ft/min, for example, about 22 ft/min (6.7 m/min); pore size of about 55–65 microns, for example, about 62 microns; wet tensile strength of at least about 7 lbs/in, for example, 8.5 lbs./in (3.9 kg/in); burst strength wet off of the machine of about 15–25 psi, for example, about 23 psi (159 kPa). The cellulose media can be treated with fine fiber, for example, fibers having a size (diameter) of 5 microns or less, and in some instances, submicron. A variety of methods can be utilized for application of the fine fiber to the media, if it is desired to use fine fiber. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. An alternative is a trade secret approach comprising a fine polymeric fiber web positioned over conventional media, practiced under trade secret by Donaldson Company under the designation ULTRA-WEB®. With respect to the configurations of the filter element, if it is desired to use fine fiber, there is no particular preference for: how the fine fibers are made; and, what particular method is used to apply the fine fibers. Enough fine fiber typically would be applied until the resulting media construction would have the following properties: initial efficiency of 99.5% average, with no individual test below 90%, tested according to SAE J726C, using SAE fine dust; and an overall efficiency of 99.98% average, according to SAE J726C.

Example of usable filter constructions are described in U.S. Pat. No. 5,820,646, which patent is incorporated by reference herein.

In another example embodiment the fluted construction (not shown) includes tapered flutes. By "tapered," it is meant that the flutes enlarge along their length such that the downstream opening of the flutes is larger than the upstream opening. Such filter constructions are described in U.S. patent application Ser. No. 08/639,220, herein incorporated by reference in its entirety.

In general, the filter assembly 34 has a circular cross-section and a cylindrical shape. The filter assembly 34 has a first radius R1, FIG. 14, and a first length L1, FIG. 13. For the embodiment illustrated in FIGS. 12–14, typically, the first radius R1 is greater than 7 inches, preferably between 7 inches and 12 inches, and most preferably approximately 9 inches. Typically, the first length L1 of the filter assembly 34 is greater than 5 inches, preferably between 5 inches and 12 inches, and most preferably approximately 7 inches.

Referring now to FIG. 13, the filter assembly 34 preferably includes a pull mechanism 188. The pull mechanism 188 is designed and constructed to allow a user to easily remove the filter assembly 34 from the filter housing 36, FIG. 2.

Preferably, the pull mechanism 188 includes a handle 189 and a retention mechanism 190. Typically, the handle 189 is a knob 191. Preferably, the retention mechanism 190 includes a bolt 192 and a nut 193. A first end 194 of the bolt 192 is attached to the knob 191. A second end 195 of the bolt 192 is secured to the nut 193. During assembly, the first end 194 of the bolt 192 is attached to the knob 191. The second end 193 is slid through the center core 186 of the filter assembly 34, until the knob 191 is seated against the filter assembly 34. The nut 193 is attached to the second end 195 of the bolt 192, securing the pull mechanism 188 in place.

Alternatively, the pull mechanism and the core of the filter media could be one integrated unit.

E. Filter Housing

Figure 16:
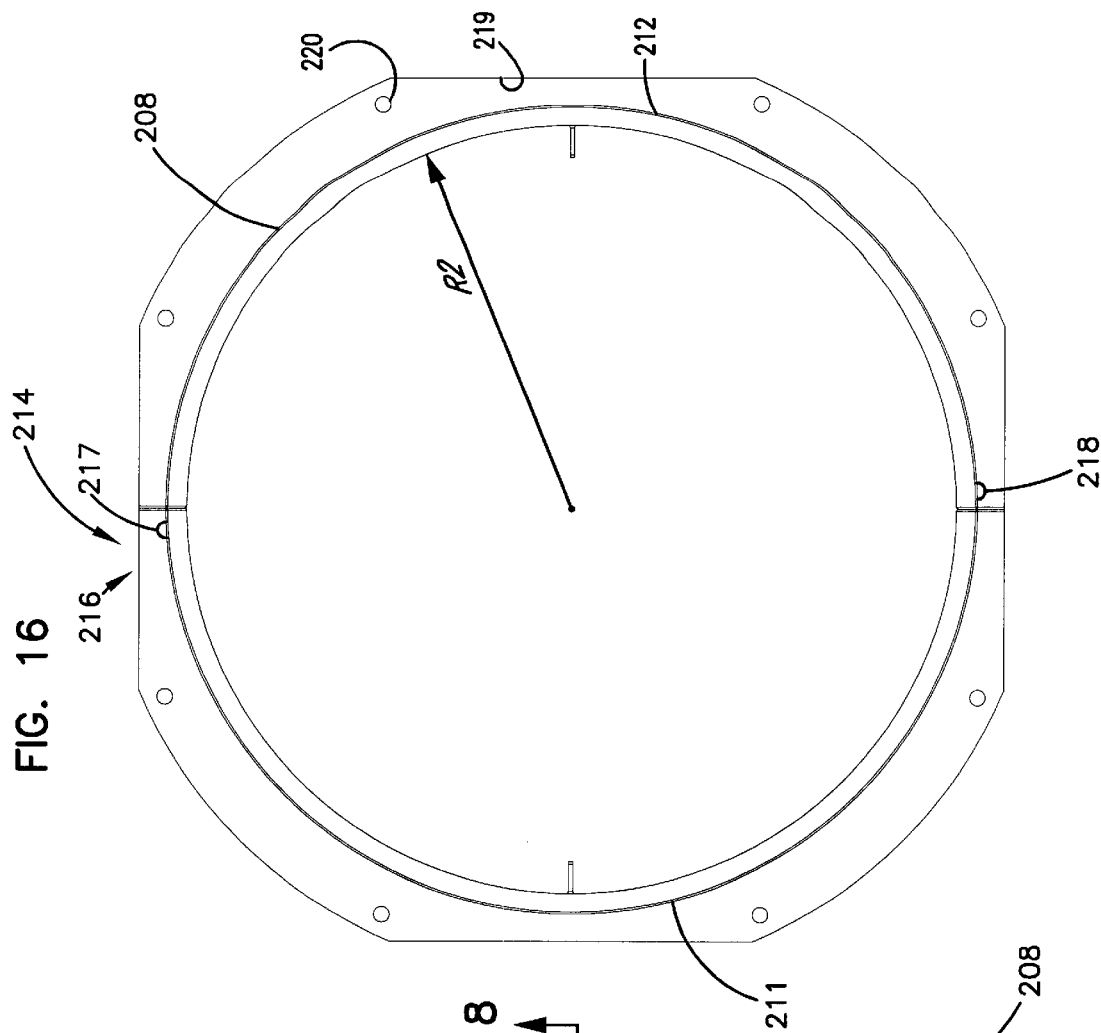
FIG. 16 is a schematic, plan view of a housing for the filter arrangement depicted in FIGS. 2–4.
Figure 17:
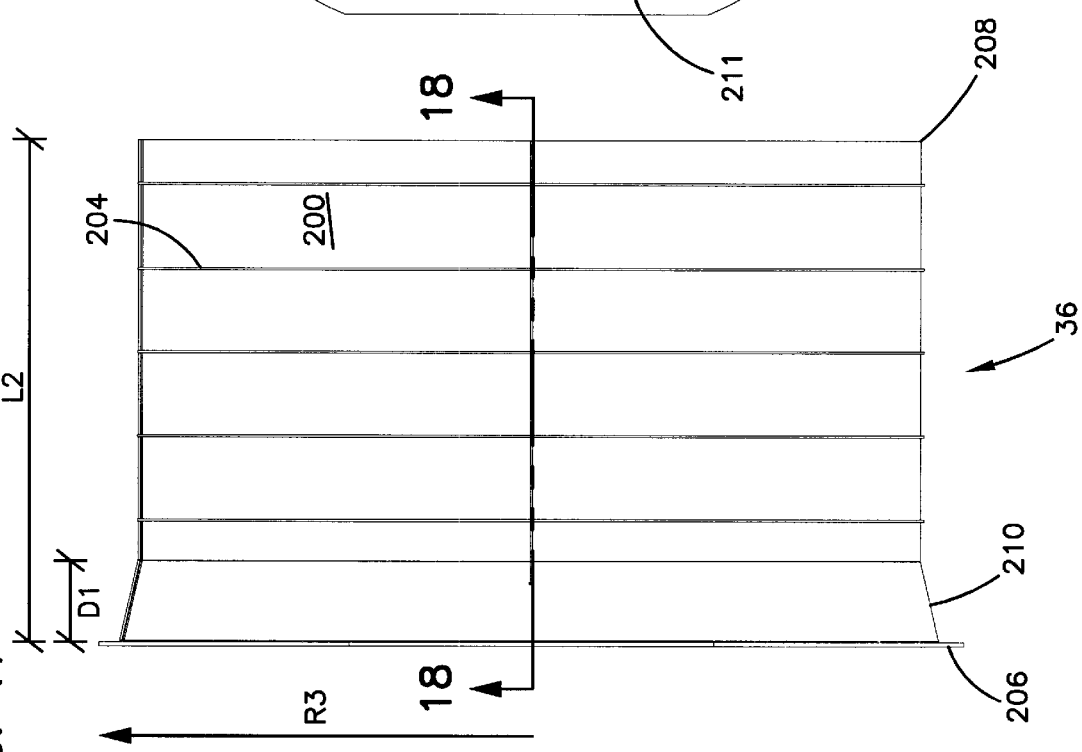
FIG. 17 is a schematic, side elevational view of the housing depicted in FIG. 16.
Figure 18:
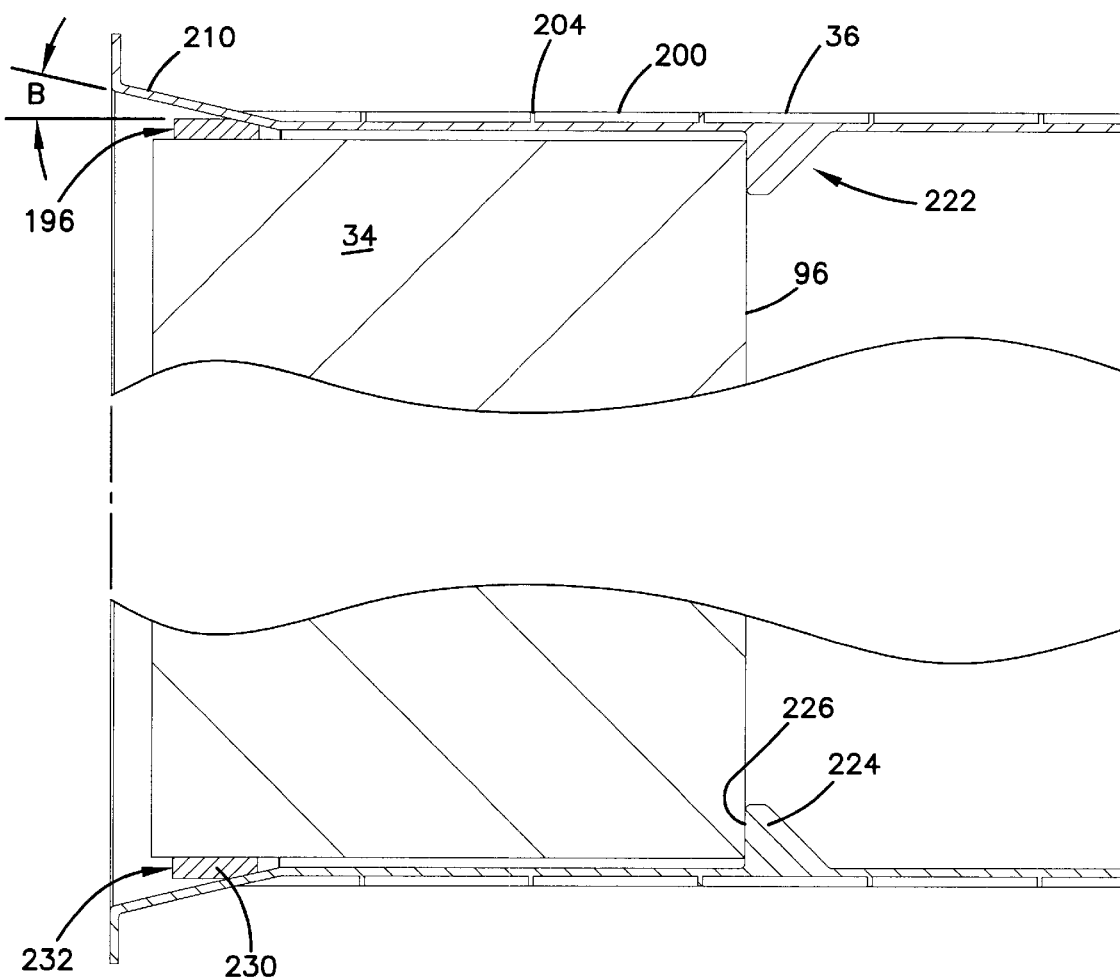
FIG. 18 is a schematic, cross-sectional view, taken along line 18—18 of FIG. 17, of the filer assembly of FIGS. 2–4 and the housing of FIGS. 16–17.

Attention is directed to FIGS. 16–18. FIGS. 16–18 schematically illustrate the filter housing 36 of the filter arrangement 24 depicted in FIG. 2. Referring to FIG. 18, preferably, the filter housing 36 is designed and constructed to receive the filter assembly 34 of FIGS. 12–14 and retain the filter assembly 34 during use. The filter housing 36 is also designed and constructed to be retained within the system 20, FIG. 1.

Referring to FIG. 17, the filter housing 36 has an outer wall 200. The outer wall 200 has a second radius R2. To receive the filter assembly 34, the second radius R2 should be slightly larger than the first radius R1 of the filter assembly 34. Typically, the second radius R2 is at least 7 inches, preferably between 7 and 12 inches, and most preferably approximately 9.1 inches.

Referring to FIGS. 17 and 18, preferably, the outer wall 200 includes a plurality of projections or ribs 204. The ribs 204 add strength to the overall filter housing 36 structure. Typically, the ribs 204 project from the outer wall 200 at least 0.05 inches, preferably between 0.05 inches 0.20 inches, and most preferably approximately 0.10 inches.

In general, the filter housing 36 is designed and constructed to facilitate sealing with the filter assembly 34. The filter housing 36 has a first end 206 and an opposite, second end 208. Generally, the first end 206 is the upstream end and the second end 208 is the downstream end. The first end 206 has a third radius R3, FIG. 17. Preferably, the third radius R3 of the first end 206 is larger than the second radius R2 of the second end 208. Typically, the third radius R3 is at least 7 inches, preferably between 7 and 12 inches, and most preferably approximately 9.6 inches.

In general, the filter housing 36 is also designed and constructed to help sound attenuation and to receive the filter assembly 34 of FIGS. 10–12. The filter housing 36 has a second length L2. The second length L2 is at least equal to the first length L1 to receive the filter assembly 34. However, because of the desire for sound attenuation, the particular length of the second length L2 might be longer than the first length LI. Typically, the second length L2 is at least 5 inches, preferably between 7 and 15 inches, and most preferably approximately 12 inches.

To transition between the smaller second radius R2 and the larger third radius R3, at the first end 206, and to facilitate sealing with the filter assembly 34, FIG. 12, the filter housing 36 includes a transition area 210. The transition area 210 has a first distance D1. Typically, the first distance is at least 0.5 inches, preferably between 1 inch and 4 inches, and most preferably approximately 2 inches. Preferably, the transition area 210 is angled from the outer wall 200 at angle B. Preferably, the angle B is at least 10 degrees, preferably between 10 and 20 degrees, and most preferably about 15 degrees. The transition area 210 aids in sealing the filter assembly 34 as will be explained in more detail below.

Preferably, the filter housing 36 comprises a plastic and is manufactured by injection molding, as is commonly known. Preferably, the filter housing 36 is manufactured in two mirror image halves 211, 212. Because the two halves 211, 212 are mirror images of each other, only one mold is required for manufacturing. This aids in the assembly of the filter arrangement 24, FIG. 2.

To further aid in the assembly of the filter housing 36, the filter housing 36 includes a joint mechanism 214 to join the two halves during assembly. Preferably, the joint mechanism 214 includes a standard tongue and groove joint 216. The second half 212 includes a first overlapping piece 217. The first overlapping piece 217 is designed to overlap the outer wall 200 of the first half 211. Likewise, the first half 211 includes a second overlapping piece 218, designed to overlap the outer wall 200 of the second half 212.

The filter housing 36 further includes a mounting flange 219. The mounting flange 219 is designed and constructed to aid in securing the filter housing 36 to the tube sheet 37, of FIG. 2, as will be described in more detail below. As such, preferably, the mounting flange 219 includes a plurality of bolt holes 220. The bolt holes 220 are provided to receive bolts for attachment to the tube sheet. Alternatively, any suitable method of attachment may be used, such as ultrasonic welding.

The housing 36 also includes a stopping arrangement 222. The stopping arrangement 222 is designed and constructed to seat the filter assembly 34 within the housing 36 and to prevent the filter assembly 34 from being pushed too far into the housing 36. The stopping arrangement 222 also helps in ensuring a proper seal between the filter assembly 34 and the housing 36 as will be explained in more detail below.

The stopping arrangement 222 includes a stop 224. Preferably, the stop 224 projects from the outer wall 200 a distance sufficient to prevent the filter assembly 34 from bypassing the stop 224. During use, the filter assembly 34 rests upon a top surface 226 of the stop 224.

F. Sealing Mechanism

The filter assembly 34 also includes a sealing mechanism 196. The sealing mechanism 196 seals the filter assembly 34 in the filter housing 36, preventing undesirable amounts of air from entering the system 20, FIG. 1, between the filter assembly 34 and the filter housing 36 and bypassing the filter assembly 34. This ensures that the air stream goes substantially through the filter assembly 34.

Referring back to FIG. 12, preferably, the sealing mechanism 196 at least partially extends circumferentially around the radial edge of the first end 94 of the filter assembly 34. Preferably, the sealing mechanism 196 includes a sealing gasket 230. The sealing gasket 230 is typically adhered to the filter assembly 34 around its circumference. Referring now to FIG. 13, the sealing gasket 230 has a first width W1 and a first thickness T1. In general, the first width W1 and the first thickness T1 are determined by the material used and the sealing characteristics sought. Typically, the first thickness T1 is at least 0.1 inches, preferably between 0.1 and 0.4 inches, and most preferably approximately 0.25 inches. Typically, the first width W1 is at least 0.5 inches, preferably, between 0.5 inches and 2.5 inches, and most preferably 1.5 inches. Preferably, the sealing gasket 230 comprises closed cell foam, of course, the sealing gasket 230 can comprise any suitable material.

Referring back to FIG. 18, during use, the sealing arrangement 196 seals a joint 232 between the filter assembly 34 and the filter housing 36 to prevent undesirable amounts of air from passing through the joint 232 and bypassing the filter assembly 34. During installation, the second end of 96 of the filter assembly 34 is inserted into the housing 36 until the first end 96 rests against the top surface 226 of the stop 224. As the filter assembly 34 is installed, the sealing gasket 230 is compressed in the transition area 210 between the filter assembly 34 and the housing 36, sealing the joint 232 from allowing undesirable amounts of air to pass through the joint 232. The angle B of the transition area 210 allows the sealing gasket 230 to be compressed. Typically the sealing gasket 230 is compressed at least 5% and preferably between 5 and 75%. Of course, because of the angle B of the transition area 210, the amount of compression along the sealing gasket 230 varies.

G. Tube Sheet

Figure 19:
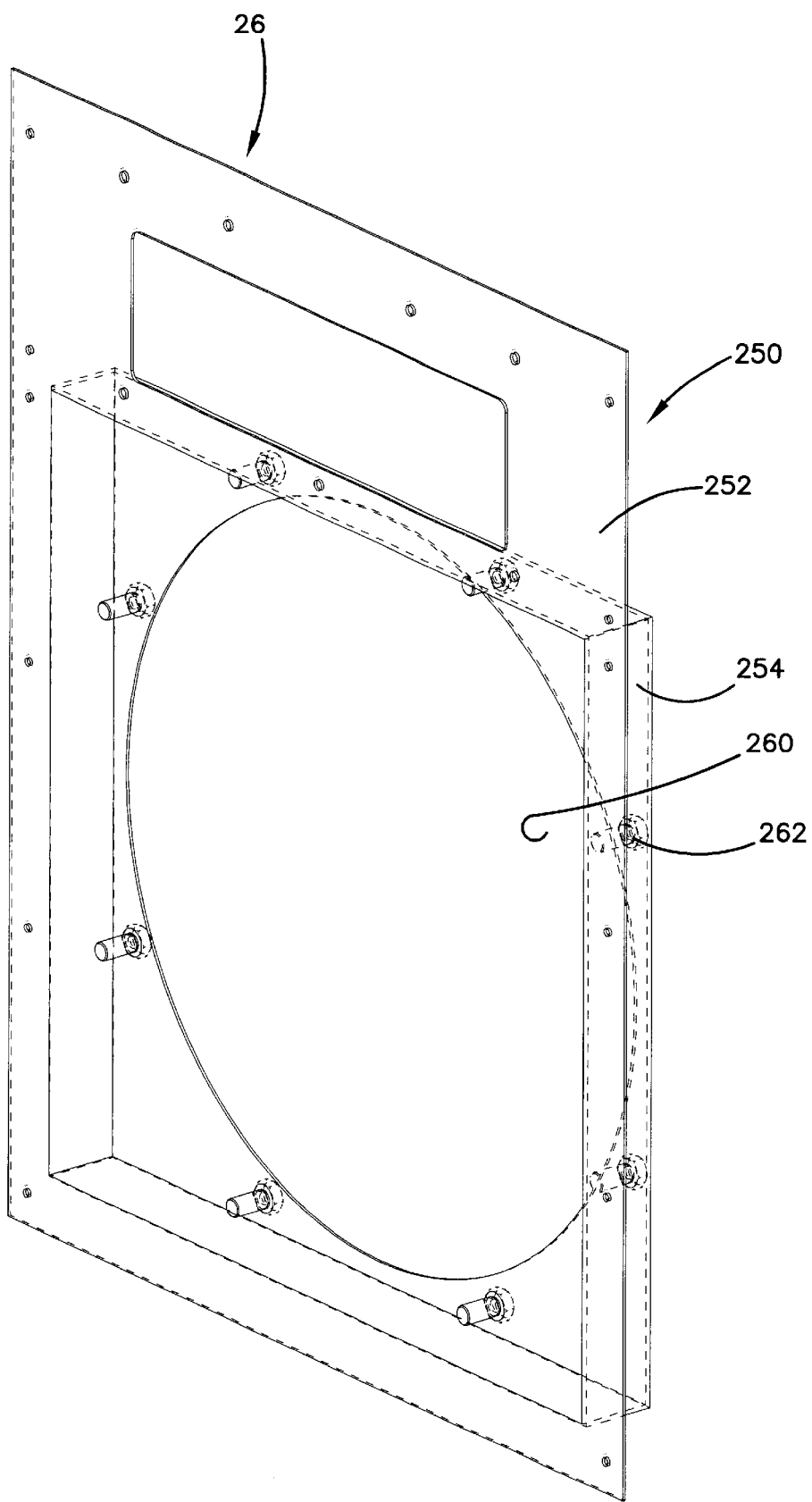
FIG. 19 is a schematic, perspective view of a tube sheet of the filter arrangement depicted in FIGS. 2–4.

Attention is directed to FIG. 19. FIG. 19 is a schematic, perspective view of the tube sheet. The tube sheet 37 is designed and constructed to receive the filter housing 36 and to retain the filter housing 36 within the system 20. The tube sheet 37 includes a frame construction 250. Preferably, the frame construction 250 includes an outer frame 252 and an inner frame 254. The outer frame 252 is designed and constructed to mount the tube sheet 37 within the overall system 20 of FIG. 1, as is commonly known.

The inner frame 254 is designed and constructed to receive and retain the filter housing 36 of FIGS. 16–18. The inner frame 254 defines a third cavity 260 designed and constructed to receive the filter housing 36. As such the third cavity 260 has a generally circular cross section having a radius slightly larger than the second radius R2 of the filter housing 36. The inner frame 254 includes a plurality of bolt retention receptors 262, adapted to receive standard bolts.

During assembly, the second end 208 of the filter housing 36 is slid into the third cavity 260 until the mounting flange 219 of the filter housing is seated against the inner frame 254 of the tube sheet 37. Bolts are slid through the bolt holes 220 in the filter housing 36 into the bolt retention receptors 262 in the inner frame 254 of the tube sheet 37. The bolts are tightened to firmly seat the filter housing 36 against the tube sheet 37. Preferably, a sealing mechanism, commonly known, seals a joint between the mounting flange 219 of the filter housing 36 and the tube sheet 37 to prevent undesirable amounts of air from entering the System 20, FIG. 1, through this joint and bypassing the filter assembly 34.

Referring back to FIG. 18, the filter assembly 34 is seated within the filter housing 36. The second end 96 is placed within the filter housing 36. The filter assembly 34 is slid into the filter housing 36 until the second end 96 of the filter assembly 34 rests on the top surface 226 of the stop 224. The sealing gasket 230 is partially compressed and the filter assembly 34 is snugly held with the filter housing 36. By the term "snuggly held," it is meant the filter assembly 34 is secured by frictional engagement within the filter housing 36 sufficiently to help prevent the filter assembly 34 from dislodging during use. The sealing mechanism 196 aids in retaining the filter assembly 34 within the filter housing 36. The sealing mechanism 196 exerts pressure against the filter housing 36 as it tries to return to its uncompressed state. FIGS. 5 and 6 illustrate the filter arrangement 24 in its assembled state.

H. Methods

Referring to FIG. 1, in operation, the filter arrangement 24 is used as follows. Air to be filtered in the system 20 is directed at arrows 23 into the intake system 22. The air flow through the filter assembly 34. The air enters at the inlet face 92, FIG. 13, passes through the fluted construction 50, FIG. 15, and exits through the outlet face 93, FIG. 13. From there, the air is taken into the turbine or generator 30.

After a period of operation, the filter arrangement 24 should be serviced, i.e. removed and replaced. To service, the filter assembly 34 is grasped by the knob 191, FIG. 13, and removed from the filter housing 36. Pulling on the filter assembly 34 by the knob 191 releases the seal between the filter assembly 34 and the filter housing 36. This can be done by pulling the filter assembly 34 from frictional engagement with the filter housing 36. The old filter assembly 34 may then be disposed of. A second, new filter assembly 34 is provided. The new filter assembly 34 is then placed inside of the filter housing 36 until the filter assembly 34 hits the stop 224 and is snugly held within the filter housing 36. A seal is formed by compressing the sealing gasket 230 between the filter assembly 34 and the filter housing 36. This frictional engagement helps to hold the filter assembly 34 in place. It should be noted that the pressure of the system 20 also helps to hold the filter assembly 34 in place.

Preferably, the filter assembly 34 is constructed completely of non-metallic materials, such that they can be readily incinerated. Preferably, the filter assembly 34 is at least 95%, more typically at least 99% non-metallic. The above specification, examples, and data provide a complete description of the manufacture and use of the invention. Many embodiments of the invention can be made.

We claim:

1. A filter arrangement comprising:
   (a) a filter assembly having opposite first and second ends, a first axial length between said first and second ends, and a plurality of flutes;
      (i) each of said flutes having a first end portion adjacent to said filter assembly first end, and a second end portion adjacent to said filter assembly second end;
         (A) selected ones of said flutes being open at said first end portion and closed at said second end portion; and selected ones of said flutes being closed at said first end portion and open at said second end portion;
   (b) a filter housing circumscribing said filter assembly;
      (i) said filter housing including an outer cylindrical wall having a central axis, a first housing end, a second housing end, and a transition area between said first housing end and said second housing end;
         (A) said first housing end being circular with a first radius; and said second housing end being circular with a second radius;
            (1) said first radius being larger than said second radius;

(B) said transition area being angled relative to the central axis; and (c) a seal member circumscribing said filter assembly;
(i) said seal member being compressed between and against said transition area of said housing and an outer radial portion of said filter assembly to form a seal between said housing and said filter assembly.

2. A filter arrangement according to claim 1 wherein:
(a) said seal member includes a gasket circumscribing said filter assembly.

3. A filter arrangement according to claim, 1 wherein:
(a) said seal member includes a gasket adhered to an outer radial surface of said filter assembly.

4. A filter arrangement according to claim 1 wherein:
(a) said seal member includes a gasket comprising closed cell foam; said gasket having a width of at least 0.5 in.

5. A filter arrangement according to claim 1 wherein:
(a) said filter housing further includes a stop arrangement;
(i) said stop arrangement including a stop member projecting from said filter housing wall;
(ii) said filter assembly second end engaging said stop member.

6. A filter arrangement according to claim 5 wherein:
(a) said transition area is angled relative to the central axis at an angle of 10–20 degrees.

7. A filter arrangement according to claim 6 wherein:
(a) said seal member is compressed at least 5% between and against said transition area of said housing and said filter assembly.

8. A filter arrangement according to claim 5 wherein:
(a) said filter housing further includes a mounting flange at said first housing end.

9. A filter arrangement according to claim 5 wherein:
(a) said filter housing includes a second axial length between said first housing end and said second housing end;
(i) said second axial length is greater than said first axial length of said filter assembly by at least 2 inches.

10. A filter arrangement according to claim 1 wherein:
(a) said filter assembly includes a knob projecting from said first end.

11. A filtration system comprising:
(a) a tube sheet having at least a single cavity;
(b) a filter housing removably and replaceably mounted in said cavity;
(i) said filter housing including an outer cylindrical wall having a central axis, a first housing end, a second housing end, a transition area between said first housing end and said second housing end, and a mounting flange;
(A) said first housing end being circular with a first radius; and said second housing end being circular with a second radius;
(1) said first radius being larger than said second radius;
(B) said transition area being angled relative to the central axis;
(C) said mounting flange engaging said tube sheet to allow said filter housing to be mounted within said cavity of said tube sheet;
(c) a filter assembly secured within said filter housing, said filter assembly having opposite first and second ends and a plurality of flutes;
(i) each of said flutes having a first end portion adjacent to said filter assembly first end, and a second end portion adjacent to said filter assembly second end;
(A) selected ones of said flutes being open at said first end portion and closed at said second end portion; and selected ones of said flutes being closed at said first end portion and open at said second end portion; and
(d) a seal member circumscribing said filter assembly;
(i) said seal member beings compressed between and against said transition area of said housing and an outer radial portion of said filter assembly to form a seal between said housing and said filter assembly.

12. A filtration system according to claim 11 further including:
(a) a plurality of bolts connecting said mounting flange to said tube sheet.

13. A filtration system according to claim 11 wherein:
(a) said seal member includes a gasket comprising closed cell foam; said gasket having a width of at least 0.5 in.

14. A filtration system according to claim, 13 wherein:
(a) said filter housing further includes a stop arrangement;
(i) said stop arrangement including a stop member projecting from said filter housing wall;
(ii) said filter assembly second end engaging said stop member.

15. A filtration system according to claim 11 wherein:
(a) said filter assembly includes a knob projecting from said first end.

16. A method of servicing an air filtration system for a gas turbine system; the method comprising:
(a) removing a filter assembly from a filter housing by grasping a pull mechanism; the filter housing being mounted through a cavity in a tube sheet;
(i) the filter housing including an outer cylindrical wall having a central axis, a first housing end, a second housing end, and a transition area between the first housing end and the second housing end;
(A) the first housing end being circular with a first radius; and the second housing end being circular with a second radius;
(1) the first radius being larger than the second radius;
(B) the transition area being angled relative to the central axis; and
(b) replacing the filter assembly with a second filter assembly by pressing the second filter assembly within the filter housing until it is secured within the filter housing; the second filter assembly having opposite first and second ends; and a plurality of flutes;
(i) each of the flutes having a first end portion adjacent to the filter assembly first end, and a second end portion adjacent to the filter assembly second end; and
(A) selected ones of the flutes being open at the first end portion and closed at the second end portion; and selected ones of the flutes being closed at the first end portion and open at the second end portion;
(ii) the step of replacing including forming a seal by compressing a seal member between and against the transition area of the filter housing and a portion of the second filter assembly.

17. A method according to claim 16 wherein:
(a) said step of removing the filter assembly includes:
(i) pulling a knob secured to the filter assembly, to remove the filter assembly from the filter housing.

* * * * *